United States Patent [19]

O'Reilly et al.

[11] Patent Number: 5,743,657

[45] Date of Patent: Apr. 28, 1998

[54] TILTING PAD JOURNAL BEARING

[75] Inventors: Peter D O'Reilly, Osterley, England; Peter G Stopp, Guilsfield, Wales

[73] Assignee: The Glacier Metal Company Limited, England

[21] Appl. No.: 793,012

[22] PCT Filed: Jul. 24, 1995

[86] PCT No.: PCT/GB95/01734

§ 371 Date: Feb. 12, 1997

§ 102(e) Date: Feb. 12, 1997

[87] PCT Pub. No.: WO96/05442

PCT Pub. Date: Feb. 22, 1996

[30] Foreign Application Priority Data

Aug. 6, 1994 [GB] United Kingdom ............... 9415964

[51] Int. Cl.$^6$ ................................................. F16C 17/03
[52] U.S. Cl. ............................................................ 384/312

[58] Field of Search ........................ 384/312, 114, 384/117, 311, 309, 308

[56] References Cited

U.S. PATENT DOCUMENTS

| 3,053,587 | 9/1962 | Wallgren ............... 384/312 |
| 4,714,357 | 12/1987 | Groth et al. ............... 384/312 |

FOREIGN PATENT DOCUMENTS

| 1 301 673 | of 1969 | Germany. |
| 817137 | of 1959 | United Kingdom. |
| 1 397 551 | of 1975 | United Kingdom. |

*Primary Examiner*—Lenard A. Footland
*Attorney, Agent, or Firm*—Nixon & Vanderhye

[57] ABSTRACT

This invention relates to journal bearings of the tilting pad type in which a ring of circumferentially spaced bearing pads are disposed in a housing to surround coaxially a rotating shaft, and are capable of tilting in the housing on at least an axis substantially parallel with the shaft.

12 Claims, 2 Drawing Sheets

TILTING PAD JOURNAL BEARING

This invention relates to journal bearings of the tilting pad type in which a ring of circumferentially spaced bearing pads are disposed in a housing to surround coaxially a rotating shaft, and are capable of tilting in the housing on at least an axis substantially parallel with the shaft.

A number of different arrangements exist by which each of the bearing pads is able to tilt about at least one axis with respect to the housing. All have the ability to tilt relative to the housing about an axis extending parallel to the shaft rotation axis and some have the ability to tilt relative to the housing about other axes to accommodate misalignment between the longitudinal axis of the housing and the shaft.

Patent specification GB-A-1397551 discloses a tilting pad journal bearing in which pads are loosely contained in a circumferential direction between stops extending radially inwardly from the housing. In operation, with a shaft present, the stops prevents the pads from being dragged in a circumferential direction by the shaft. However, it is also arranged that the circumferential separation of the ends of the stops is less than the maximum circumferential length of each pad such that the loosely assembled pads are incapable of falling out radially in the absence of a shaft. One or more of the stops may be apertured to provide a lubricant supply duct and each pad surface adjacent the housing to bear thereon in operation is of a smaller radius of curvature than the housing to permit the rocking or tilting action of the pad relative to the housing.

Although such a pad structure is apparently simple it has drawbacks both in terms of manufacture and operation. Each pad requires to be supported between radially extending pins which act as locating means to prevent the pads from being displaced circumferentially by the rotating shaft and act as pad stops to prevent the inverted pads from falling from the housing wall when the shaft is removed. The positioning of the pins between each pad puts constraints on pad disposition within a split housing. Each bearing pad tilts by rolling of cylindrical surfaces, so that tilting is restricted to rotation about an effective axis parallel to the longitudinal axis of the housing and is unable to tolerate shaft misalignment. Furthermore, such rolling action is achieved by way of a line contact by which all radial loading on the pad is transferred to the housing. It is therefore possible for the load concentration to result in plastic deformation of the bearing pad and for any radial play in the bearing to increase, that is, for the bearing to lose radial stiffness.

GB-A-2180888 discloses a vertically aligned bearing arrangement in which the bearing pads do not have to support the vertical loading of a shaft and are able to pivot with respect to the housing about many axes by virtue of a part-spherical protuberance on each pad. However, such a protuberance not only increases the complexity of the pad but results in a point contact between the bearing pad and the housing, which is even more likely to deform and reduce radial stiffness if used to support a heavy load.

CH-B-558,481 discloses a tilting pad bearing on which each bearing pad has on its radially outer surface an integral part-spherical protuberance which rests in a correspondingly curved recess in a pan whose radial position with respect to the housing is adjustable by rams. The pad is complex to manufacture by virtue of the protuberance but because the contact between protuberance and pan is on a larger area than a point or line, there should be improved radial stiffness. However, the part-spherical interface also acts as locating means to transfer circumferential loading due to shaft rotation into the housing and the slight curvature of the pan reacts this in a generally radial direction which affects the radial loading and thus the effective stiffness. Furthermore, if and when a shaft is removed, there is no means of retaining each bearing pad with respect to it supporting pan so that assembly and maintenance is difficult. Furthermore, because each bearing pad protuberance and associated pan rotate in tilting under load, the surfaces must conform as well, notwithstanding lubrication, to avoid fretting which would be the equivalent of plastic deformation as a cause of reducing radial stiffness. Thus each bearing pad should be maintained with a matched pan requiring an extensive and costly replacement for each bearing pad as well as the risk of separation if the shaft is removed.

U.S. Pat. No. 4,714,357 discloses a tilting pad journal bearing arrangement in which a ring of bearing pads line a housing and each pad carries a barrel-shaped protuberance or rocker, attached thereto by screws, arranged to sit in a cylindrical recess in the housing about which it pivots. Such an arrangement is cheaper than others because the protuberance is formed separately from the bearing pad before attachment and the barrel-shaping enables it to rock or tilt about a second axis. However, this arrangement is still considered to have drawbacks. The load on each bearing pad is transferred to the housing by way of a line contact between the rocker and recess, which by way of load concentration due to weight or transferring rotational forces may lead to deformation and reduction in radial stiffness. Furthermore, rotation about the longitudinal axis of the recess is by relative rotation of the rocker and recess surfaces, so that unless they are prepared to the same degree of curvature (and undamaged by deformation) fretting can occur and loss of stiffness. To this end, each rocker and recess pair must be kept together, but as each rocker is freely removable with its attached bearing pad, and has to be for the radial clearance defining shims to be inserted between them, assembly and manufacture is time-consuming and complicated if mistake in assembly is to be avoided.

Having regard to the above examples, it is an object of the present invention to provide a tilting pad journal bearing arrangement having a simple and cost effective bearing pad structure permitting improved bearing stiffness and pad replacement procedures which avoid compromising bearing performance.

According to the present invention a journal bearing arrangement comprises (1) an annular housing arranged operatively to surround a rotatable shaft, (2) a ring of arcuate bearing pads lining the housing at positions spaced from each other in a circumferential direction about a longitudinal axis of the housing, each pad having a radially outer face including a mounting surface, and being capable of tilting independently of the others about at least a primary tilt axis extending parallel to the longitudinal axis, and (3) associated individually with each pad position, pad mounting means comprising (i) a recess, fixed with respect to the housing, having at least in a cross-sectional plane perpendicular to the primary tilt axis, a surface forming part of a circle centred on the primary tilt axis, (ii) a platform body having a curved supported surface, supported within the recess for rotation relative to the recess about said primary tilt axis, and a supporting surface co-operable with the mounting surface of the bearing pad at that position, and (iii) spigot and socket locating means extending between the platform body and pad in the direction of a locating axis to inhibit displacement of the pad with respect to the platform body in a circumferential direction about the shaft rotation axis, the arrangement having the locating means arranged to permit displacement of the bearing pad with respect to the platform body along the locating axis, and further including pad stop means, operable to limit displacement of the pad along the locating axis to less than the spigots length of the locating means, and restraint means extending from the platform body by way of the recess and housing to permit rotational motion of the platform body about said tilt axis by sliding relative to the recess surface but prevent radial dissociation of the body from the recess.

Embodiments of the invention will now be described by way of example with reference to the accompanying drawings, in which.

Figure 1:
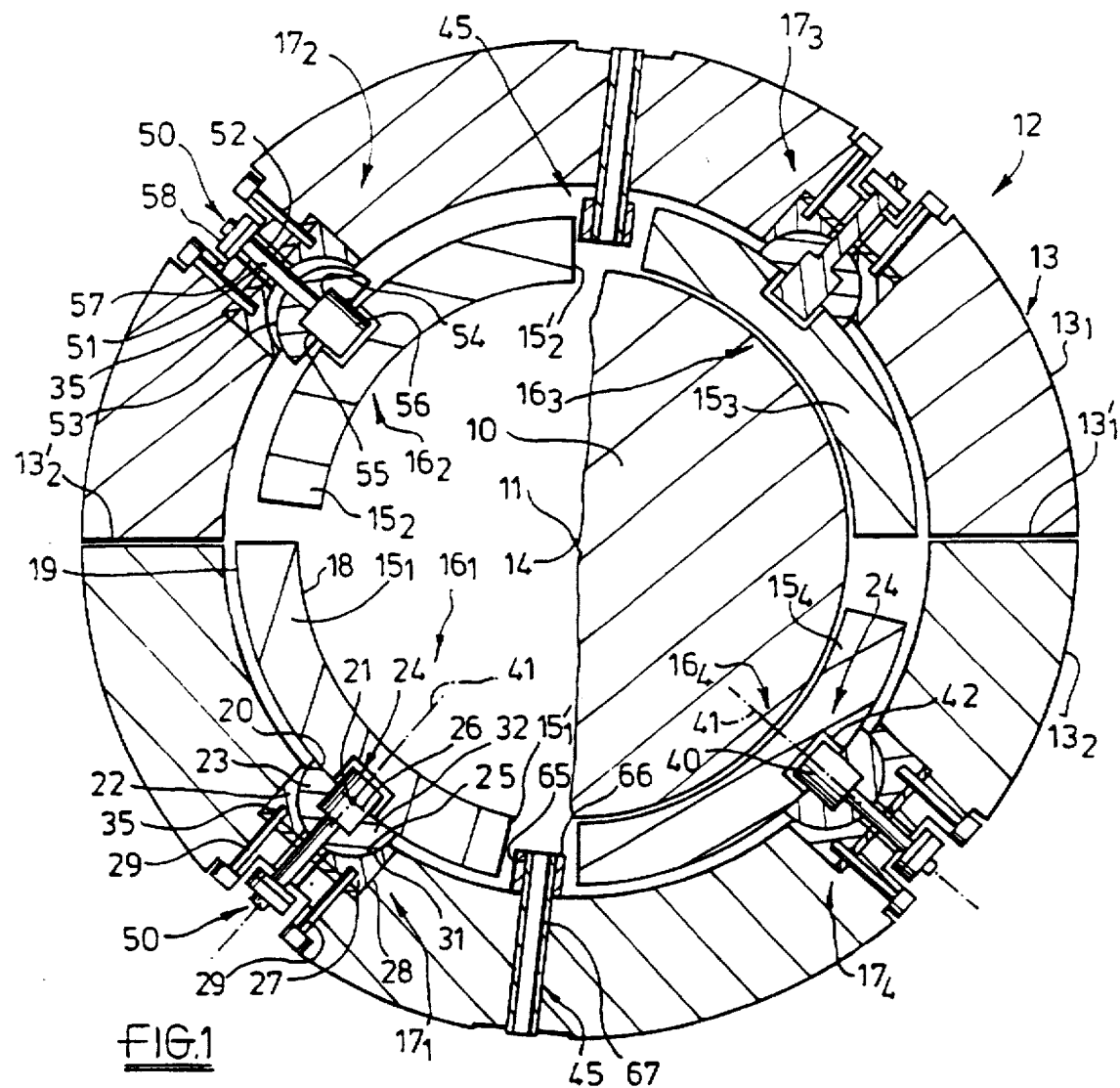
FIG. 1 is a schematic cross sectional elevation through a journal bearing arrangement in accordance with the present invention showing, for each bearing pad, pad mounting means.
Figure 2:
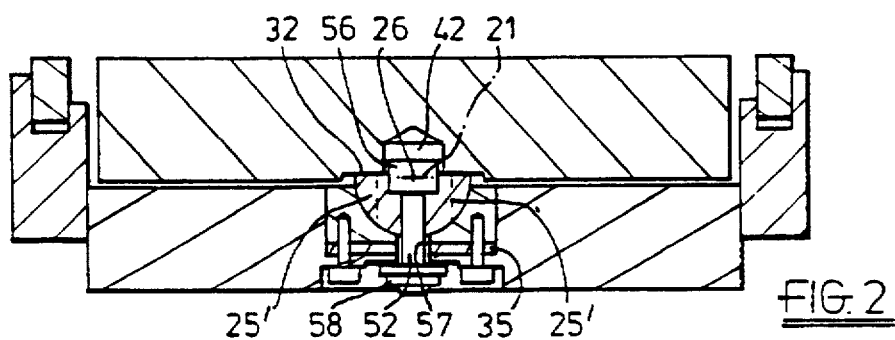
FIG. 2 is sectional radial elevation of the arrangement of FIG. 1, along the line II—II thereof through a single bearing pad and pad mounting means, shown in relation to a shaft.

Referring to FIGS. 1 and 2 a shaft 10 has a longitudinal rotation axis 11 about which it is rotatable. A journal bearing arrangement 12 comprises an annular housing 13 arranged operatively to surround the shaft, having a longitudinal axis 14 nominally coincident with shaft rotation axis 11.

For illustration and clarity of description, the right hand side of FIG. 1 is shown with a shaft 10 in place and the left hand side without the shaft. Furthermore, although the bearing arrangement exists independently of a shaft with which it is intended to work, the dimensions and other parameters of such a shaft influence the arrangement.

The housing 13 comprises two semi-cylindrical housing parts $13_1$, and $13_2$ joined at interfaces $13_1'$ and $13_2'$.

The housing is lined internally by a ring of n arcuate bearing pads $15_1$–$15_n$ at respective positions $16_1$–$16_n$ spaced from each other in a circumferential direction about axis 14. An even number of pads are disposed in diametrically opposite pairs, with a whole number of pads being contained within each housing part. As shown, there are four pads $15_1$–$15_4$ at locations $16_1$–$16_4$.

Associated with each pad position $16_1$–$16_4$ is individual pad mounting means $17_1$–$17_4$, disposed at 90° intervals about the housing but not necessarily centrally disposed with respect to each associated bearing pad.

The bearing pads and associated mounting means are essentially identical at each position and for convenience and clarity, description of each bearing pad, such as $15_1$ and mounting means $17_1$ within one housing part $12_1$ will omit subscripts except where context dictates.

Each arcuate pad 15 has a cylindrically concave radially inner face 18, corresponding to the curvature of the shaft which it supports, and a convex radially outer face 19 including a mounting surface 20 by which it is supported with respect to the housing by the mounting means 17 such that in operation the pad is capable of tilting independently of the other pads about at least a primary tilt axis 21 extending substantially parallel to the shaft rotation axis.

The bearing pad mounting means 17 comprises a recess 22, platform body 23 disposed in the recess and spigot and socket locating means 24 which extends between the platform body and bearing pad to inhibit displacement of the pad with respect to the platform body in a circumferential direction about the longitudinal axis when the shaft is in motion.

The recess 22 is fixed with respect to the housing and has, in a cross-sectional plane perpendicular to the primary tilt axis 21, a surface 25 forming part of a circle centred on that tilt axis. The recess is similarly curved about a secondary tilt axis 26, orthogonal to and intersecting the primary tilt axis, the surface 25 being defined by part of a spherical surface. The recess 22, although it may be formed directly into the wall of the housing, is preferably defined in a discrete recess member 27 disposed in a cavity 28 in the housing and secured thereto by screws 29.

The platform body 23 has a curved supported surface 31 by which it is supported in the recess for rotation relative to the recess about each tilt axis. The supported surface 31 corresponds in curvature to the recess and the platform body is supported by contact with substantially the whole area of the recess, that is, is defined by part of a spherical surface. To this end, to ensure uniform distribution of load across the surfaces without irregularities leading to stress concentrations and plastic deformation and/or fretting, the surfaces 25 and 31 are machined and/or otherwise manufactured as a matched pair.

In at least such cross-sectional plane perpendicular to the primary tilt axis the supported surface of the platform body is defined by a semi-circle, and conveniently this is repeated for all cross-sectional planes so that the supported surface is hemispherical.

A supporting surface 32 of the platform body, defined between diametrically opposite sides of the semi-circle, is co-operable with the mounting surface 20 of the bearing pad. For convenience and cost effective manufacture, both the supporting surface 32 of the body and the mounting surface 20 of the pad are machined flat so that the load is spread uniformly to mitigate stress concentration and possible plastic deformation. It will be seen that each tilt axis associated with the mounting means and pad lies in the plane of the supporting surface.

Shim means 35 disposable between the recess member 27 and base of housing cavity 28 enables the radial position of the supporting surface 32, and therefore the bearing pad surface 18, to be accurately set. In particular, by having the locations of the respective mounting means diametrically opposite in pairs, the separation of the bearing surfaces of the associated bearing pads (of known thickness) may be accurately set to the diameter of the shaft with which to be used by setting the diametrical separation of each opposite pair of supporting surfaces by way of the shim means with the bearing pads and shaft not in place.

The locating means 24 comprises a spigot member 40 carried by the platform body and extending from the supporting surface 32 in the direction of a locating axis 41 perpendicular to the supporting surface and, in normal disposition, substantially radially with respect to the housing axis. The locating means further comprises a complementary locating socket 42 defined in the mounting surface of the bearing pad and in which the spigot member forms a sliding fit.

The locating means 24 serves not only to inhibit circumferential displacement of the pad in operation but is arranged to act with pad stop means 45, as illustrated for pad $15_2$ and described fully hereinafter, to hold the pad radially in relation to the platform body to prevent a bearing pad from becoming inadvertently separated from its mounting means in the absence of the shaft, whilst permitting readily the deliberate removal and replacement of a bearing pad without upsetting the positional set up or matching surfaces of the pad mounting means.

Further associated with each mounting means 17 is restraint means, shown generally at 50, which extends from the platform body 23, by way of the recess 22 and housing 13 to permit rotational motion of the body about each tilt axis by sliding relative to the recess surface but prevent radial dissociation of the body from the recess.

Restraint means 50 comprises an elongate restraint member 51 restrained by the platform body from moving relative thereto towards the recess and having a shank 52. Through-aperture 53 of substantially the same cross-sectional dimensions as the shank extends in the platform body in a direction passing through the primary tilt axis and by way of shoulder 54 to a wider depression 55 in the supporting surface 32. The shank 52, extends along the aperture 53 and is a sliding fit therein, so as to be restrained from motion other than lengthwise, and includes an enlargement of cross-section 56, conveniently integral with the shank, which is operable by abutment with the shoulder to restrain the member from egress from the aperture 53 towards the recess. The shank 52 extends from the body by way of a clearance hole 57 in the recess member and the housing supporting the recess member to an enlarged flange portion 58 of the restraint member disposed, with a small clearance from the housing, to permit limited displacement of the supported platform body and restraint member relative to the recess surface 25.

The flange portion 58 is conveniently provided by a lock-nut arrangement 59 disposed on a threaded end portion of the shank.

Furthermore, resilient means 60, such as a light spring carried on the shank or spring washer, may be employed to bias the restraint member axially with respect to the platform body to urge the latter into contact with the recess.

As the axis of the restraint member passes through the tilt axis and is in line with the locating axis 41, the spigot member 40 is conveniently formed by an extension of the restraint member, in particular said enlargement 56 in cross-section formed integrally with the shank.

It will be appreciated that if and when a housing part is inverted, as shown for part 13$_1$, in the absence of a shaft the restraint means (as shown exaggerated for 50$_2$ of mounting means 17$_2$) permits a small displacement of the platform body and the spigot member of the locating means inwardly of the housing to the extent only of the limited longitudinal movement of the restraint member necessary to permit the platform body to pivot within the recess. Such displacement, although affecting a small separation between the matched surfaces of the body and recess, prevents the body from dissociation from its recess with the attendant risk of the correct pair not being re-matched and/or damage to the surfaces.

Restraint of the locating means with the platform body, in particular spigot member 40, permits the locating means to be employed not only to inhibit circumferential displacement of the bearing pad with a shaft in operation but also as a simple and convenient way of mounting the simplified bearing pad in the absence of a shaft.

The simple spigot member extends along the locating axis 41 in a generally radial direction for a distance above the platform body supporting surface that is sufficient for the interface between spigot member and locating socket to transfer circumferential forces in operation and is a sliding fit in the locating socket of a bearing pad such that the bearing pad can be lifted (15$_1$, 15$_4$) or fall under gravity (15$_2$, 15$_3$) in a generally radial direction for the length of the spigot member before detaching from the associated mounting means.

Pad stop means 45, operable to limit such displacement of the bearing pad along the locating axis to less than the spigot member length, comprises, for each bearing pad, an abutment surface 65 which is disposed operatively circumferentially displaced from the locating axis 41 associated with the pad and adjacent a wall portion, such as the end 15' of the pad, inclined with respect to the locating axis. The abutment surface is clear of the wall portion when the bearing pad is mounted in its operative position on the supporting surface of the platform body but is abutted by the pad as the latter moves generally radially along the locating axis and before the spigot member completely exits the locating socket, thereby restraining the bearing pad from unintentional detachment from the mounting means.

To permit intentional detachment of the bearing pad and, of course, installation of a pad, the abutment surface 65 is movable from its operative position to an inoperative one at which such abutment is avoided. Such movement may comprise displacing the abutment surface longitudinally and/or radially with respect to the housing or rotating an abutment surface, eccentric with respect to a radial axis about such axis.

Conveniently, the abutment surfaces associated with an adjacent pair of bearing pads in one housing part, are disposed between the end walls of adjacent pads in the form a collar 66 supported on a boss 67 extending radially through the housing wall, which boss is conveniently hollow and serves as a lubricating fluid supply duct to the housing.

Notwithstanding the apparent complexity of the mounting means per se the bearing arrangement is able to provide a high performance specification cost effectively with a reduction in complexity and cost of maintenance etc. during its lifetime.

It will be appreciated that the radial stiffness of the bearing is a function of how much clearance exists, or through use comes to exist, between the shaft and housing that is not occupied by a component body; such clearance may exist by virtue of the tolerances of components employed in combination and without means for accurate setting up or adjustment and/or by virtue of changes to effective dimensions of components in operation due to loads applied thereto, that is, deformation.

It will be appreciated that in terms of radial stiffness, the accurately machined flats of the pad mounting surface 20 and platform body supporting surface 32 and the accurately finished matched curved surfaces 25 and 35 of the body and recess are capable of transferring considerable radial loads, notwithstanding tilting of the body under load, with minimal plastic deformation of, and wear on, the load bearing surfaces. Furthermore, the provision of shim means 35 permits any manufacturing tolerances to be eliminated, and even for wear on the running surface 18 of a bearing pad to be compensated for during a maintenance disassembly when the pad is otherwise serviceable. Furthermore, the mounting arrangement permits such setting up by means of shim means conveniently and in the absence of bearing pad or shaft.

As an additional effect associated with optimal stiffness, the use of a hemispherical (or semi-circular) platform body and a recess which is of almost the same extent, except for the clearance hole 57 and the need to provide clearance between the supported bearing pad the housing, ensures not only that the radial load is supported over a maximum area but also that circumferential loading due to shaft rotation is also distributed over an interface having a significant radial component so as to minimise the force being reacted by the interface as a radially inward force on the bearing pad.

The bearing pads themselves, although mounted to provide tilting and high stiffness, are of simple construction as befits a consumable item which may require replacement, requiring only the locating socket and mounting surface 20 to be provided on the radially outer surface of a segment of an otherwise simply-manufactured cylindrical body whose internal bore is prepared and plated with bearing metal to the shaft diameter before being cut into the segments that form the pads.

The bearing pad structure and mounting means is to be contrasted with prior art arrangements, wherein the attainment of high stiffness is not addressed, which make use of rocking surfaces that make point or line contacts and are inherently at risk of plastic deformation from load concentration, and/or complex pad structures carrying one part of a pair of relatively rotatable surfaces are proposed. In either event, the bearing pad is relatively complex and expensive to manufacture and if changed within a housing, replaced or even moved to a different seat position, affects the stiffness of the bearing by permitting fretting or other deformation to occur at abutting supporting surfaces that are not prepared as a matched pair, the practical requirement therefore being to replace both pad and seat as a pair.

Incorporating restraint means into each platform means facilitates not only keeping each recess and platform body as a matched pair and separate from any bearing pad associated therewith, but also the location, both radially and circumferentially, of its associated bearing pad and obviates the necessity of providing wholly separate locating features, although that may be done out of choice.

Using the generally radially directed restraint means/ locating means at the part of the bearing pad towards its centre, where it is supported on the mounting means, makes it convenient to employ a split housing wherein each housing half contains the same number of bearing pads within the confines of the housing and with no requirement for inter-pad stops or the like at the sites of the joint interfaces between housing halves.

The embodiment described above with reference to FIGS. 1 and 2 may be varied in details other than those outlined in the description without departing from the invention.

Figure 3:
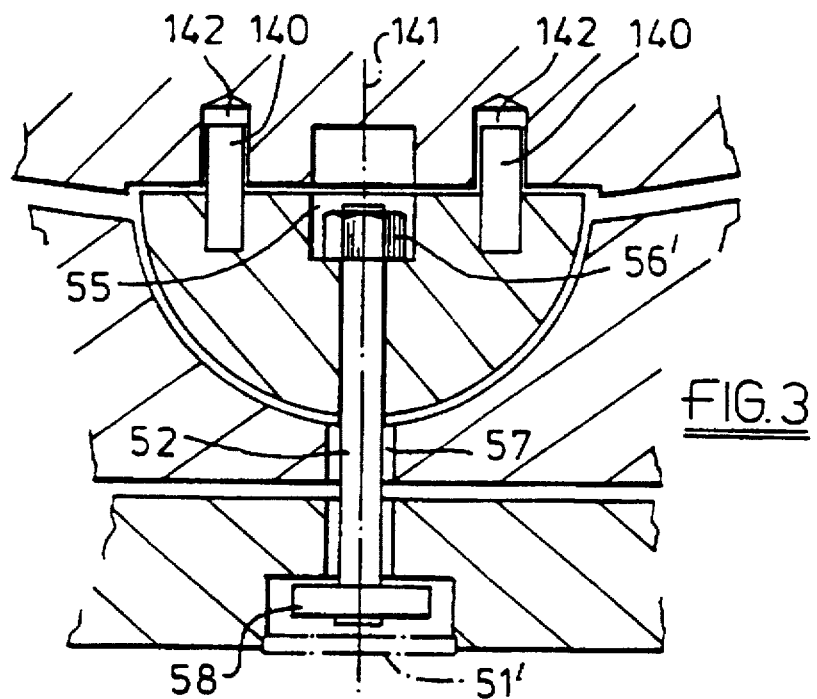
FIG. 3 is a schematic cross-sectional elevation through a section of an alternative form of bearing according to the invention illustrating a different form of locating means.

For example, in respect of the locating means, the locating spigot may be separate from the restraint member and anchored in the platform body with further spigot members, as shown at 140 in FIG. 3, displaced from the locating axis 141 with correspondingly aligned locating sockets 142 in the bearing pad. Such spigot member or members could of course be provided by projection(s) integral with the platform body. Alternatively, although it may detract from the simple pad mounting surface any spigot member may extend from the pad mounting surface and locate in a corresponding locating socket in the supporting surface of the platform body.

In respect of the restraint means, it will be understood that the restraint member enlargement 56 is prevented by shoulder 54 from falling from the arrangement should the flange portion 58 be removed or shaken loose due to vibration and to this end, an enlargement 56 integral with the shank portion 52 provides maximum security. It will be appreciated, however, that other forms of enlargement may be provided, such as an interference fit washer or a nut 56' threaded onto an end of the shank, as shown in FIG. 3; such a nut may, as shown ghosted, take the form of a spigot member of the locating means. The interface between enlargement 56 and shank 52 may be locked in some way prior to insertion of the member into body recess 55 and/or a cap 51' may be provided to ensure the shank cannot leave the housing and detract from inadvertent removal.

If the elongate restraint member is to comprise separate shank 52 and enlargement 56, the shank member 52 and flange 58 may instead be provided by a unitary body, namely a bolt on which the flange 58 forms a head.

Figure 4:
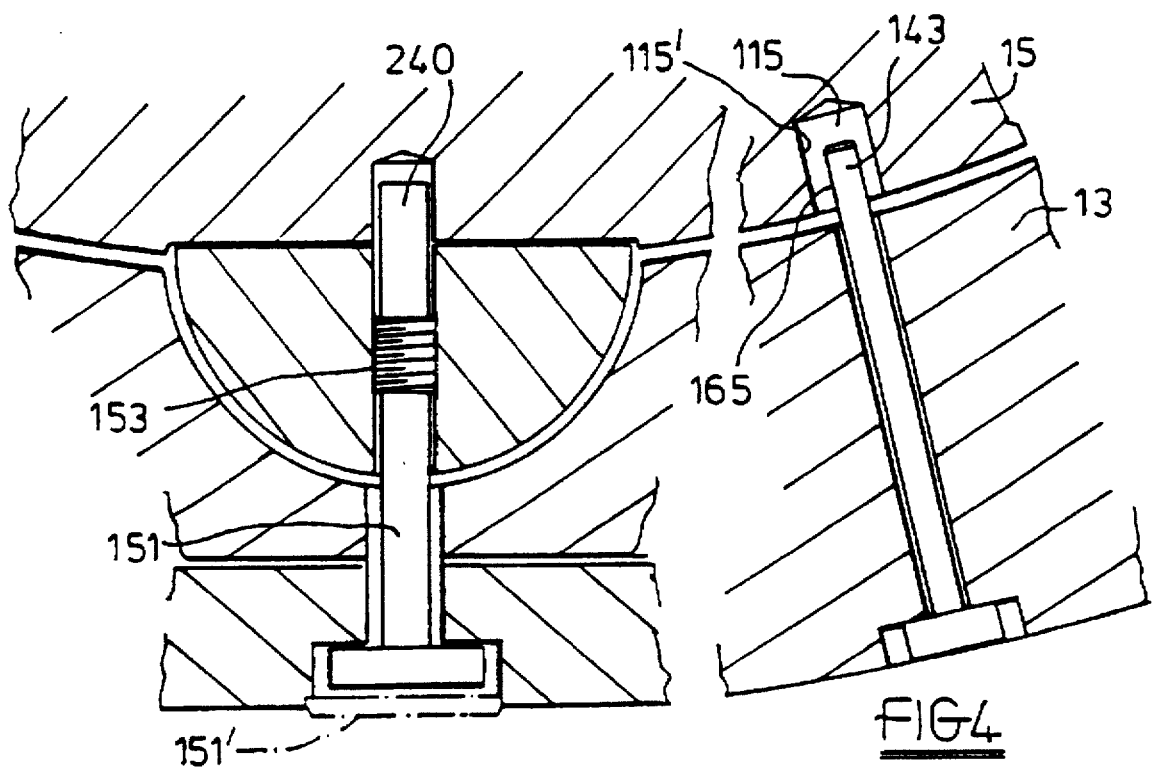
FIG. 4 is a schematic cross-sectional elevation, through yet another form of bearing according to the invention, illustrating both a different form of restraint and locating means and different form of pad stop means.

As an alternative to using such a bolt and separate enlargement 56, FIG. 4 illustrates a restraint member 151 which engages with a threaded aperture 153 in the platform body, possibly with some provision to prevent egress due to operational vibrations, such as thread locking or a cap 151' to limit its separation from the housing. Such form of restraint member may extend to provide an integral locating means spigot member 240.

Such a restraint member with integral spigot member may be rotated to displace it axially with respect to the platform body without disengaging therefrom to shorten the effective length of the spigot member and permit removal and replacement of the bearing pad without requiring displacement of the pad stop abutment means.

FIG. 4 also illustrates an alternative form of pad stop in which the bearing pad has an aperture 115, similar to the locating socket but displaced therefrom, into which a pad stop 145 extends such that the aperture wall 115' is what contacts the abutment surface 165 of the pad stop rather than pad end wall 15'.

It will be appreciated that whilst a part-spherical recess and platform body surface permit tilting of the pad orthogonal to the shaft axis to accommodate tilting of the shaft axis with respect to the housing axis, it is only in relation to tilting about the primary tilt axis that significant lateral forces have to be transmitted that benefit from a near-semi-circular shape. The recess and/or platform body may therefore be truncated in the direction of the primary tilt axis, as indicated by dotted lines 25' in FIG. 2, although uniformly spherical surfaces are preferable from a manufacturing standpoint.

It will be appreciated that by enabling the platform body to rotate about an axis other than the primary axis, such that the primary axis itself can rotate with respect to the longitudinal axis of the housing, the platform body supporting surface and bearing pad can remain parallel to the axes of the shaft if the shaft is inclined with respect to the longitudinal axis of the housing. However, if there is certainty that the axes are parallel or the extent of any divergence is known and fixed, then the primary tilt axis may be defined in relation to the shaft by way of reference to the longitudinal axis of the housing and having the recess and platform body provided with matching cylindrically curved surfaces.

As indicated above, the shim means 35 may be omitted if desired or the recess may be formed directly within the housing wall.

Where shim means are provided to enable adjustment of the radial position of each recess member/platform body, the longitudinal axes of shaft and housing are assumed parallel and a split housing is employed, it will be appreciated that instead of setting radial positions by reference to the distance separating opposing platform bodies, they may be set by reference to a datum surface extending between the housing joint interfaces $13_1'$ and $13_2'$ and passing through the longitudinal axis 14.

The mounting surface 20 of the bearing pad and supporting surface 32 of the platform body are required to complement each other to transfer load without deformation and, as the pad and platform body are not provided as a matched pair, it is important that the surfaces can be properly defined in separate operations. The preferred manufacture is thus of flat surfaces but it will be appreciated that any complementary shape capable of separate and repeatable manufacture may be used.

For example, the radially outer surface 19 of each arcuate pad 15 may be formed to the same radius of curvature as the internal wall of the associated housing part including the mounting surface 20. During manufacture each bearing pad mounting means (FIGS. 1 and 2) may be disposed with respect to the housing part in a temporary fashion without shim means 35 and with the locating means 24 replaced by a screw or bolt arrangement which holds the platform body 23 tightly within its recess. The radially inner wall of the housing is then machined to the desired cylindrical dimensions along with the supporting surface 32 of the platform body. Thereafter the mounting means is reassembled as described above and the curved mounting surface 20 bears uniformly on the correspondingly curved supporting surface 32.

As described above, the platform body and recess member 27 are conveniently formed of a suitable load bearing and workable metal which can not only withstand the operational loading but also the manufacturing process; conveniently both parts are formed of steel, notwithstanding the requirement to lubricate the surface 25 in operation. However, if desired, the platform body may be made of a sintered metal matrix loaded with a dry lubricant, which material permits any asperities of initial manufacture to be mitigated by bedding-in with respect to a recess of more wear-resistant material. Such material may not only reduce the manufacturing processes required to get a matched pair of surfaces but also mitigate lubrication effort. Such material is available commercially from Glacier GmbH-Deva Werke, Stadtellendorf, Germany.

There may be other than four bearing pads and also there may be an odd number of bearing pads in an appropriate housing configuration.

We claim:

1. A journal bearing arrangement for use with a shaft having a rotation axis which the shaft is rotatable, the arrangement comprising
   (1) an annular housing having a longitudinal axis arranged operatively to surround a said shaft with which used,
   (2) a ring of arcuate bearing pads lining the housing at positions spaced from each other in a circumferential direction about said longitudinal axis of the housing, each pad having a radially outer face including a mounting surface and being capable of tilting independently of the others about at least a primary tilt axis extending substantially parallel to the shaft rotation axis, and
   (3) associated individually with each pad position, pad mounting means comprising
      (i) a recess, fixed with respect to the housing, having at least in a cross-sectional plane perpendicular to the primary tilt axis, a surface forming part of a circle centred on the primary tilt axis,
      (ii) a platform body having a curved supported surface, supported within the recess for rotation relative to the recess about said primary tilt axis, and a supporting surface co-operable with the mounting surface of the bearing pad at that position,
      (iii) spigot and socket locating means extending between the platform body and pad in the direction of a locating axis to inhibit displacement of the pad with respect to the platform body in a circumferential direction about the shaft rotation axis but to permit displacement of the bearing pad with respect to the platform body along the locating axis,
      (iv) pad stop means, operable to limit displacement of the pad along the locating axis to less than the spigot length of the locating means, and
      (v) restraint means extending from the platform body by way of the recess and housing to permit rotational motion of the platform body about said tilt axis by sliding relative to the recess surface but prevent radial dissociation of the body from the recess.

2. An arrangement as claimed in claim 1 in which the restraint means comprises an elongate restraint member restrained by the platform body from moving relative thereto towards the recess and having a shank portion extending by way of a clearance hole in the recess and housing to an enlarged flange portion of the member disposed to permit limited displacement of the supported platform body and restraint member relative to the recess surface.

3. An arrangement as claimed in claim 2 in which said shank portion extends in said platform body along a direction passing through said primary tilt axis.

4. An arrangement as claimed in claim 2 in which the locating means comprises a substantially radially directed locating socket in the mounting surface of the bearing pad and a spigot member, formed by an extension of said restraint member extending from the supporting surface and forming a sliding fit in said locating socket.

5. An arrangement as claimed in claim 1 in which the locating means comprises at least one substantially radially directed locating socket in the mounting surface of the bearing pad and a corresponding number of spigot members, each carried by the platform body, extending from the supporting surface and each forming a sliding fit in a corresponding locating socket.

6. An arrangement as claimed in claim 1 in which the pad stop means comprises, for each bearing pad, an abutment surface, operatively disposed circumferentially displaced from the locating axis and adjacent a wall portion of the pad inclined with respect to each locating socket, to be abutted by, and restrain, said wall portion in response to displacement of said bearing pad from the platform along said locating axis and the abutment surface is movable from an operative disposition to permit intentional separation and engagement of the locating means between bearing pad and platform body.

7. An arrangement as claimed in claim 1 in which the supported surface of the platform body corresponds in curvature to the recess and the platform body is supported by contact with substantially the whole area of the recess.

8. An arrangement as claimed in claim 1 in which the supported surface of the platform body is defined in at least said cross-sectional plane by a semi-circle with said supporting surface being defined between diametrically opposite sides of said semi-circle.

9. An arrangement as claimed in claim 1 in which the recess and the platform body exhibit curvature about, and said platform body is tiltable with respect to the recess about, at least a secondary tilt axis orthogonal to the primary tilt axis.

10. An arrangement as claimed in claim 9 in which the recess and supported surface of the platform body are defined by parts of spherical surfaces.

11. An arrangement as claimed in claim 1 in which each recess is defined in a discrete recess member disposed in, and secured to, the housing.

12. An arrangement as claimed in claim 1 in which there is an even number of pad locations and each said platform body supporting surface diametrically faces another in the housing.

* * * * *